(12) United States Patent
Kim

(10) Patent No.: US 8,812,619 B2
(45) Date of Patent: Aug. 19, 2014

(54) NETWORK SCANNER AND METHOD OF PROVIDING UNIFORM RESOURCE LOCATOR

(75) Inventor: Duk-yong Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 388 days.

(21) Appl. No.: 11/126,324

(22) Filed: May 11, 2005

(65) Prior Publication Data

US 2006/0031229 A1    Feb. 9, 2006

(30) Foreign Application Priority Data

Jul. 26, 2004    (KR) .................. 10-2004-0058344

(51) Int. Cl.
*G06F 15/16*    (2006.01)

(52) U.S. Cl.
USPC ......................................................... 709/218

(58) Field of Classification Search
USPC ............... 709/223, 218; 707/104.1, E17.008; 382/305, 306
See application file for complete search history.

(56) References Cited

U.S. PATENT DOCUMENTS

| | | | | |
|---|---|---|---|---|
| 6,246,745 B1* | 6/2001 | Bi et al. | ............................ | 378/54 |
| 6,427,032 B1* | 7/2002 | Irons et al. | ..................... | 382/306 |
| 6,731,410 B2* | 5/2004 | Saito et al. | ..................... | 358/468 |
| 6,983,415 B2* | 1/2006 | Shima | ............................ | 715/200 |
| 7,120,910 B2* | 10/2006 | Matsuda et al. | .............. | 718/102 |
| 2002/0000468 A1* | 1/2002 | Bansal | ..................... | 235/462.15 |
| 2002/0018245 A1* | 2/2002 | Saito et al. | ..................... | 358/468 |
| 2002/0107983 A1* | 8/2002 | Iyoki | ............................. | 709/245 |
| 2002/0191222 A1* | 12/2002 | Miyamura et al. | ............ | 358/402 |
| 2002/0198954 A1* | 12/2002 | Okamoto et al. | ............. | 709/213 |
| 2003/0046445 A1* | 3/2003 | Witt et al. | ..................... | 709/321 |
| 2005/0154289 A1* | 7/2005 | Judd et al. | ..................... | 600/407 |

FOREIGN PATENT DOCUMENTS

| | | |
|---|---|---|
| JP | 2000-137705 | 5/2000 |
| JP | 2001-217983 | 8/2001 |
| JP | 2001-290695 | 10/2001 |
| JP | 2003-108453 | 4/2003 |
| JP | 2003-189039 | 7/2003 |
| JP | 2004-070719 | 3/2004 |
| KR | 2000-45-94 A | 7/2000 |
| VA | 11-215345 | 8/1999 |
| WO | 2001-268307 | 9/2001 |

OTHER PUBLICATIONS

Machine Translation: Chigusa, Takaya, Network Scanner, Jul. 4, 2003, JP 2003189039 A, 5 pages.*
Office Action dated Jan. 27, 2006 of Korean Patent Application No. 10-2004-0058344.
Chinese Office Action dated Sep. 21, 2007 issued in CN 200510084991.7.

* cited by examiner

*Primary Examiner* — Sulaiman Nooristany
(74) *Attorney, Agent, or Firm* — Stanzione & Kim, LLP

(57) ABSTRACT

A network scanner and a method of providing a URL corresponding to an image of document, when a user scans a document in a network scanner that includes an IP address. The method includes scanning a document in the network scanner that includes the IP address, generating the image of the document, storing the image of the scanned document, generating a URL to connect to the stored image, and providing the generated URL.

16 Claims, 3 Drawing Sheets

NETWORK SCANNER AND METHOD OF PROVIDING UNIFORM RESOURCE LOCATOR

CROSS-REFERENCE TO RELATED APPLICATIONS

This application claims the priority under 35 U.S.C. §119 of Korean Patent Application No. 10-2004-58344, filed on Jul. 26, 2004, in the Korean Intellectual Property Office, the disclosure of which is incorporated herein in its entirety by reference.

BACKGROUND OF THE INVENTION

1. Field of the Invention

The present general inventive concept relates to a network scanner, and more particularly, to a network scanner and a method of providing a uniform resource locator (URL) corresponding to an image of a document, when a user scans the document on a network scanner that includes an internet protocol (IP) address.

2. Description of the Related Art

A user can generate an image by scanning and then post the image on the world wide web (WWW). FIG. 1 is a flow diagram illustrating a conventional method of posting an image on the WWW.

Referring to FIG. 1, a user scans a document (S100). A scanned image of the document is stored, such as in a computer (S102). Afterward, the user connects the computer to a web account (S104). The user uploads the image stored in the computer to the WWW (S106). At this time, a URL corresponding to the image is obtained (S108), and the user posts the image according to the obtained URL (S110). As described above, the conventional method of posting an image on the web is complicated. Therefore, a method of easily posting a scanned image on the web is needed.

A system for managing a multi-page file that receives a URL in a network scanner is disclosed in Japanese Patent Laid-Open Publication 2001-290695.

SUMMARY OF THE INVENTION

The present general inventive concept provides a method of providing a URL corresponding to an image of a document when a user scans the document on a network scanner that includes an IP address.

The present general inventive concept also provides a network scanner that includes an IP address and provides a URL corresponding to an image of a document when a user scans the document on the network scanner.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a method of providing a URL, the method comprising scanning a document in a network scanner that includes an IP address, generating an image of the scanned document, storing the image of the scanned document, generating a URL that can connect to the stored image, and providing the generated URL.

The foregoing and/or other aspects and advantages of the present general inventive concept may also be achieved by providing a network scanner that includes an IP address, the network scanner comprising a scan unit to generate an image of a document by scanning the document, a storage unit to store the image of the scanned document, a URL generation unit to generate a URL to connect to the stored image, and a URL provision unit to provide the generated URL to a computer.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
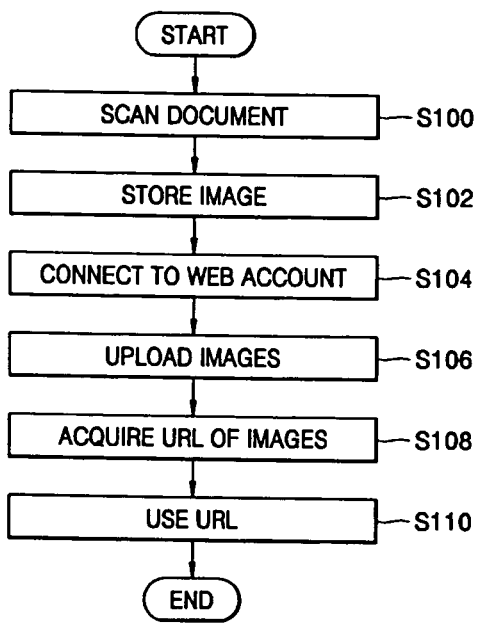
FIG. 1 is a flow diagram illustrating a conventional method of posting an image on the web.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
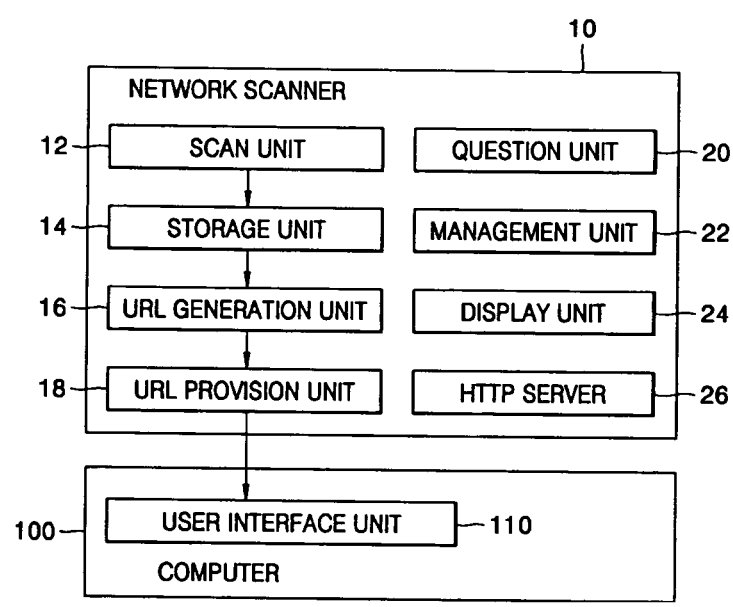
FIG. 2 is a block diagram illustrating a network scanner and a computer according to an embodiment of the present general inventive concept.

FIG. 2 is a block diagram illustrating a network scanner 10 and a computer 100 according to an embodiment of the present general inventive concept.

Referring to FIG. 2, the network scanner 10 comprises a scan unit 12, a storage unit 14, a URL generation unit 16, a URL provision unit 18, a question unit 20, a management unit 22, a display unit 24, and a hypertext transfer protocol (HTTP) server 26. The computer 100 is connected to the network scanner 10 and includes a user interface unit 110 connected to a network or the Internet.

The network scanner 10 includes an IP address, and a user of the computer 100 can connect to the network scanner 10 through the user interface unit 110 using the IP address. Also, the network scanner 10 can support HTTP.

The scan unit 12 scans a document and generates an image of the document. The image is transformed to a (JPEG) file or a (BMP) file using a scan driver in the network scanner 10.

The storage unit 14 stores the image of the scanned document. The storage unit 14 can store the image according to a user who scanned the document. For example, a folder can exist for each user to store that user's images.

The URL generation unit 16 generates a URL to connect to the stored image. More specifically, the URL generation unit 16 generates a file name corresponding to the stored image, and generates a URL using the generated file name and the IP address of the network scanner 10.

The URL provision unit 18 provides the generated URL to the user interface unit 110 of the computer 100, which is connected to the network scanner 10.

The question unit 20 asks the user of the network scanner 10 whether the user wants the network scanner 10 to provide the URL. When the user wants the URL, the network scanner 10 generates and provides the URL. Once the user has acquired the URL from the network scanner 10, the user can use the URL to retrieve the corresponding image on the Internet.

The management unit 22 manages the storage unit 14. The storage unit 14 can be located in the network scanner 10, as illustrated in FIG. 2. Alternatively, the storage unit 14 can also be located externally with respect to the network scanner 10. The capacity of the storage unit 14 located in the network scanner 10 may be limited. Therefore, the management unit 22 can manage the storage unit 14 such that the image stored in the storage unit 14 is erased after a predetermined time. Also, the management unit 22 can manage the storage unit 14 not to store an image greater than a predetermined size therein.

The display unit 24 displays images stored in the storage unit 14 to the user of the computer 100 connected to the network scanner 10. The display unit 24 can display the images in a thumbnail form, and when the user selects a thumbnail of a particular image, the full particular image is displayed. The display unit 24 can classify images according to the user who created the images, and can display all of the stored images or only the images created by a particular user.

The HTTP server 26 follows HTTP protocol and can generate a hypertext markup language (HTML) document. The HTTP server 26 can show the stored image in a thumbnail form by including the image in the generated HTML document.

Figure 3:
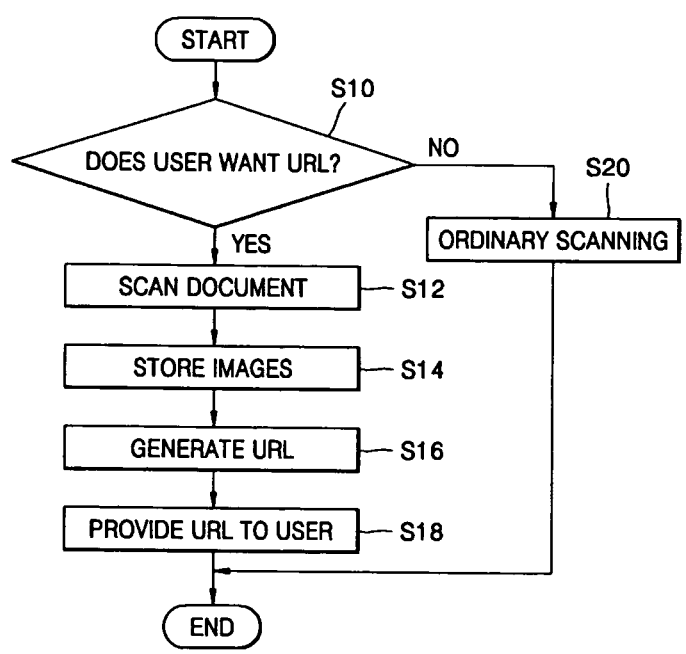
FIG. 3 is a flow diagram illustrating a method of providing a URL according to an embodiment of the present general inventive concept.

FIG. 3 is a flow diagram illustrating a method of providing a URL according to an embodiment of the present general inventive concept.

Referring to FIG. 3, a network scanner that includes an IP address asks a user of the network scanner whether the user wants to be provided with a URL (S10). When the user does not want to be provided with the URL, the network scanner performs an ordinary scanning operation (S20).

At operation S10, if the user wants to be provided with the URL, the network scanner scans the document and generates an image of the document (S12). Then, the image of the scanned document is stored (S14). The image of the scanned document can be stored in a storage unit in the network scanner. Also, the stored image can be classified according to the user.

Next, a URL to connect to the stored image is generated (S16). More specifically, a file name corresponding to the stored image is generated and a URL is generated using the generated file name and the IP address of the network scanner.

The URL is then provided to a computer of the user, which is connected to the network scanner (S18).

The user who acquired the URL to connect to the stored image can retrieve the image on the Internet using the URL.

The storage unit in the network scanner may have a limited capacity. Therefore, the storage unit can be managed such that images stored therein are erased after a predetermined time. Also, the storage unit can be managed not to store images greater than a predetermined size.

The images stored in the storage unit can be displayed to be viewed by the user of the computer connected to the network scanner. To view the stored images from the network scanner through the Internet, the user connects to an HTTP server included in the network scanner, using a web browser. The HTTP server can display the stored images in thumbnail form by generating an HTML document including the stored images. The user can use a menu in an initial screen of the HTML document to read the stored image. For example, the menu may be structured as follows:

1. read all images scanned by the user
2. read all images stored in the network scanner If option 1 is selected, a simple login process may be required. In both options, the stored images can be initially displayed in thumbnail form, and when the user selects a thumbnail of a particular image, the full particular image can be displayed.

As described above, the present general inventive can be applied to a network scanner. However, the present general inventive concept can also be applied to a network multi-functional device. The multi-functional device can include a scanner, a printer, a copier, and a facsimile.

As described above, according to the present general inventive concept, when scanning using a network scanner, the network scanner can directly store images in a storage unit in the network scanner and provide a URL corresponding to the images to a user. The user can then retrieve the images on the internet using the URL.

According to the present general inventive concept, a URL can be easily provided by simply scanning images. More specifically, when scanning images, an image file is automatically stored in a network scanner and a user can be provided with a URL that includes an IP address of the network scanner and a name of the image file. The user can retrieve the images on the internet using the URL.

Also, stored images can be easily read by an HTML document provided by an HTTP server of the network scanner.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A network scanning apparatus connected to a network, the network scanning apparatus comprising:
   a scan unit to scan a document to generate an image of the scanned document when a request for providing a uniform resource locator (URL) is received;
   a storage unit to store the generated image of the scanned document in the network scanning apparatus;
   a URL generation unit to generate the URL corresponding to the stored image of the scanned document; and
   a URL provision unit to provide information about the generated URL to a computing device through the network, the provided information about the generated URL comprising a file name corresponding to the stored images and an IP address of the network scanning apparatus,
   wherein the generated URL is accessible to the stored image in the network scanning apparatus.

2. The network scanning apparatus of claim 1, wherein the URL generation unit generates the URL to identify the generated image of the scanned document among from a plurality of images stored in the network scanning apparatus.

3. The network scanning apparatus of claim 1, wherein the network scanning apparatus includes the IP address.

4. The network scanning apparatus of claim 1, further comprising:
   a question unit to determine whether a user wants to generate a URL corresponding to the stored file,
   wherein if the question unit determines that the user desires to generate the URL, the URL generation unit generates the URL and the URL provision unit provides the information about the generated URL.

5. The network scanning apparatus of claim 1, further comprising:
a server to generate a hypertext markup language (HTML) document corresponding to the stored images, following a hypertext transfer protocol (HTTP).

6. The network scanning apparatus of claim 5, wherein the server provides the stored image as the HTML document.

7. The network scanning apparatus of claim 5, wherein the HTML document is accessible by a web browser of the computing device, through the server.

8. A method for providing a uniform resource locator (URL) at a network scanning apparatus connected to a network, the method comprising:
scanning, at a scan unit, a document to generate an image of the scanned document when a request for providing the URL is received;
storing the generated image of the scanned document in a storage unit of the network scanning apparatus and generating, at a URL generation unit, the URL corresponding to the stored image of the scanned document; and
providing, at a URL provision unit, information about the generated URL to a computing device through the network, the provided information about the generated URL comprising a file name corresponding to the stored images and an IP address of the network scanning apparatus,
wherein the generated URL is accessible to the stored image in the network scanning apparatus.

9. The method of claim 8, wherein the generating of the URL comprises generating the URL to identify the generated image of the scanned document among from a plurality of images stored in the network scanning apparatus.

10. The method of claim 8, wherein the network scanning apparatus includes the IP address.

11. The method of claim 8, further comprising:
determining, at a question unit, whether a user wants to generate a URL corresponding to the stored file,
wherein if it is determined that the user desires to generate the URL, the URL is generated and the information about the generated URL is provided.

12. The method of claim 8, further comprising:
generating, at a server, a hypertext markup language (HTML) document corresponding to the stored images, following a hypertext transfer protocol (HTTP).

13. The method of claim 12, wherein the stored image is provided as the HTML document by the server.

14. The method of claim 8, wherein the HTML document is accessible by a web browser of the computing device, through the server.

15. A method for providing a uniform resource locator (URL) at a network scanning apparatus connected to a communications network, the method comprising:
when a request to provide the URL is received by the network scanning apparatus, scanning a document with a scanning device to generate an image of the scanned document;
storing the generated image of the scanned document in a storage device of the network scanning apparatus and generating the URL corresponding to the stored image of the scanned document; and
providing at least the generated URL to a computing device communicatively coupled to the communications network so that the stored image is selectable from the storage unit using the generated URL, the provided information about the generated URL comprising a file name corresponding to the stored images and an IP address of the network scanning apparatus.

16. A network scanning apparatus connected to a network, the network scanning apparatus comprising:
a scanning device to scan a document to generate an image of the scanned document when a request to provide the URL is received by the network scanning apparatus;
a storage device to store the generated image of the scanned document of the network scanning apparatus;
a URL generation device to generating the URL corresponding to the stored image of the scanned document; and
a URL provision device to provide at least the generated URL to a computing device communicatively coupled to the communications network so that the stored image is selectable from the storage unit using the generated URL, the provided information about the generated URL comprising a file name corresponding to the stored images and an IP address of the network scanning apparatus.

* * * * *